(12) United States Patent
Seppanen (10) Patent No.: US 10,318,196 B1
(45) Date of Patent: Jun. 11, 2019

(54) STATELESS STORAGE SYSTEM CONTROLLER IN A DIRECT FLASH STORAGE SYSTEM

(71) Applicant: Pure Storage, Inc., Mountain View, CA (US)

(72) Inventor: Eric D. Seppanen, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 15/414,760

(22) Filed: Jan. 25, 2017

Related U.S. Application Data (63) Continuation of application No. 14/736,240, filed on Jun. 10, 2015, now Pat. No. 9,588,691.

(51) Int. Cl.
*G06F 3/00* (2006.01)
*G06F 3/06* (2006.01)

(52) U.S. Cl.
CPC .......... *G06F 3/0629* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — David Yi
*Assistant Examiner* — Craig S Goldschmidt (57) ABSTRACT

Dynamically managing control information in a storage device, including: querying, by an array management module executing on a storage array controller, the storage device for a location of control information for the storage device, the control information describing the state of one or more memory blocks in the storage device; and issuing, by the array management module in dependence upon the location of the control information for the storage device, a request to retrieve the control information for the storage device.

15 Claims, 5 Drawing Sheets

(56) References Cited

U.S. PATENT DOCUMENTS

| | | | |
|---|---|---|---|
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,055,893 B2* | 11/2011 | Locker | G06F 9/4416 709/222 |
| 8,086,585 B1 | 12/2011 | Brashers et al. | |
| 8,271,700 B1 | 9/2012 | Annem et al. | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,104,616 B1* | 8/2015 | Mitra | G06F 11/1435 |
| 9,124,569 B2 | 9/2015 | Hussain et al. | |
| 9,134,922 B2 | 9/2015 | Rajagopal et al. | |
| 9,183,218 B1* | 11/2015 | Wallace | G06F 17/30156 |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,444,822 B1 | 9/2016 | Borowiec et al. | |
| 9,507,532 B1 | 11/2016 | Colgrove et al. | |
| 2002/0013802 A1 | 1/2002 | Mori et al. | |
| 2003/0115162 A1* | 6/2003 | Konick | G06Q 10/08 705/404 |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Vana Gundy et al. | |
| 2006/0129817 A1 | 6/2006 | Borneman et al. | |
| 2006/0161726 A1* | 7/2006 | Lasser | G06F 12/0246 711/103 |
| 2006/0230245 A1 | 10/2006 | Gounares et al. | |
| 2006/0239075 A1* | 10/2006 | Williams | G11C 29/76 365/185.17 |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1* | 6/2007 | Pandit | G06F 3/0616 711/170 |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0082865 A1* | 4/2008 | Matsuoka | G11B 20/1879 714/42 |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1* | 10/2010 | Murphy | G06F 11/1453 707/681 |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0193169 A1 | 7/2015 | Sundaram et al. | |
| 2015/0378888 A1 | 12/2015 | Zhang et al. | |
| 2016/0098323 A1 | 4/2016 | Mutha et al. | |
| 2016/0350009 A1 | 12/2016 | Cerreta et al. | |
| 2016/0352720 A1 | 12/2016 | Hu et al. | |

(56) References Cited

U.S. PATENT DOCUMENTS

2016/0352830 A1 12/2016 Borowiec et al.
2016/0352834 A1 12/2016 Borowiec et al.

FOREIGN PATENT DOCUMENTS

| WO | WO2013071087 A1 | 5/2013 |
|---|---|---|
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |

OTHER PUBLICATIONS

PCMag. "Storage Array Definition". Published May 10, 2013. <http://web.archive.org/web/20130510121646/http://www.pcmag.com/encyclopedia/term/52091/storage-array>, 2 pages.
Google Search of "storage array define" performed by the Examiner on Nov. 4, 2015 for U.S. Appl. No. 14/725,278, Results limited to entries dated before 2012, 1 page.
Techopedia. "What is a disk array". Published Jan. 13, 2012. <http://web.archive.org/web/20120113053358/http://www.techopedia.com/definition/1009/disk-array>, 1 page.
Webopedia. "What is a disk array". Published May 26, 2011. <http://web.archive.org/web/20110526081214/http://www.webopedia.com/TERM/D/disk_array.html>, 2 pages.
Li et al., *Access Control for the Services Oriented Architecture*, Proceedings of the 2007 ACM Workshop on Secure Web Services (SWS '07), Nov. 2007, pp. 9-17, ACM New York, NY.
The International Search Report and the Written Opinion received from the International Searching Authority (ISA/EPO) for International Application No. PCT/US2016/015006, dated Apr. 29, 2016, 12 pages.
The International Search Report and the Written Opinion received from the International Searching Authority (ISA/EPO) for International Application No. PCT/US2016/015008, dated May 4, 2016, 12 pages.
C. Hota et al., *Capability-based Cryptographic Data Access Control in Cloud Computing*, Int. J. Advanced Networking and Applications, col. 1, Issue 1, dated Aug. 2011, 10 pages.
The International Search Report and the Written Opinion received from the International Searching Authority (ISA/EPO) for International Application No. PCT/US2016/020410, dated Jul. 8, 2016, 17 pages.
The International Search Report and the Written Opinion received from the International Searching Authority (ISA/EPO) for International Application No. PCT/US2016/032084, dated Jul. 18, 2016, 12 pages.
Faith, "dictzip file format", GitHub.com (online). [Accessed Jul. 28, 2015], 1 page, URL: https://github.com/fidlej/idzip.
Wikipedia, "Convergent Encryption", Wikipedia.org (online), accessed Sep. 8, 2015, 2 pages, URL: en.wikipedia.org/wiki/Convergent_encryption.
Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.
The International Search Report and the Written Opinion received from the International Searching Authority (ISA/EPO) for International Application No. PCT/US2016/016333, dated Jun. 8, 2016, 12 pages.

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.
The International Search Report and the Written Opinion received from the International Searching Authority (ISA/EPO) for International Application No. PCT/US2016/032052, dated Aug. 30, 2016, 17 pages.
Microsoft, "Hybrid for SharePoint Server 2013—Security Reference Architecture", <http://hybrid.office.com/img/Security_Reference_Architecture.pdf> (online), dated Oct. 2014, 53 pages.
Microsoft, "Hybrid Identity", <http://aka.ms/HybridIdentityWp> (online), dated Apr. 2014, 36 pages.
Microsoft, "Hybrid Identity Management", <http://download.microsoft.com/download/E/A/E/EAE57CD1-A80B-423C-96BB-142FAAC630139/Hybrid_Identity_Datasheet.pdf> (online), published Apr. 2014, 17 pages.
Jacob Bellamy-McIntyre et al., "OpenID and the Enterprise: A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.
The International Search Report and the Written Opinion received from the International Searching Authority (ISA/EPO) for International Application No. PCT/US2016/035492, dated Aug. 17, 2016, 10 pages.
Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.
Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.
Zhang et al., *Application-Aware and Software-Defined SSD Scheme for Tencent Large-Scale Storage System*, 2016 IEEE 22nd International Conference on Parallel and Distributed Systems, Dec. 2016, pp. 482-490, Institute of Electrical and Electronics Engineers (IEEE) Computer Society, Digital Object Identifier: 10.1109/ICPADS.2016.0071, USA.
Bjørling, *OpenChannel Solid State Drives NVMe Specification*, Revision 1.2, Apr. 2016, 24 pages, LightNVM.io (online), URL: http://lightnvm.io/docs/Open-ChannelSSDInterfaceSpecification12-final.pdf.
International Search Report and Written Opinion, PCT/US2016/036693, dated Aug. 29, 2016, 10 pages.
International Search Report and Written Opinion, PCT/US2016/038758, dated Oct. 7, 2016, 10 pages.
International Search Report and Written Opinion, PCT/US2016/040393, dated Sep. 22, 2016, 10 pages.
International Search Report and Written Opinion, PCT/US2016/044020, dated Sep. 30, 2016, 11 pages.
International Search Report and Written Opinion, PCT/US2016/044874, dated Oct. 7, 2016, 11 pages.
International Search Report and Written Opinion, PCT/US2016/044875, dated Oct. 5, 2016, 13 pages.
International Search Report and Written Opinion, PCT/US2016/044876, dated Oct. 21, 2016, 12 pages.
International Search Report and Written Opinion, PCT/US2016/044877, dated Sep. 29, 2016, 13 pages.

* cited by examiner

FIG. 5

STATELESS STORAGE SYSTEM CONTROLLER IN A DIRECT FLASH STORAGE SYSTEM

CROSS-REFERENCE TO RELATED APPLICATION

This application is a continuation application of and claims priority from U.S. patent application Ser. No. 14/736,240, filed on Jun. 10, 2015.

TECHNICAL FIELD

The field of technology is methods, apparatuses, and products for dynamically managing control information in a storage device.

BACKGROUND ART

Enterprise storage systems can provide large amounts of computer storage to modern enterprises. Such computer storage can be embodied as a plurality of storage devices such as hard disk drives ('HDDs'), solid-state drives ('SSDs'), and so on. The performance of such enterprise storage systems may be negatively impacted as the storage devices are tasked with functions other than reading data and writing data. For example, the performance of such enterprise storage systems may be negatively impacted as the storage devices are tasked with performing garbage collection operations or other device management operations. As such, the storage devices may be utilizing a finite set of resources to perform device management operations that may vary at different points in time, thereby leading to users of the enterprise storage system to experience inconsistent performance at different points in time.

SUMMARY OF INVENTION

Methods, apparatuses, and products for dynamically managing control information in a storage device are disclosed. In some embodiments, dynamically managing control information in a storage device can include: querying, by an array management module executing on a storage array controller, the storage device for a location of control information for the storage device, the control information describing the state of one or more memory blocks in the storage device; and issuing, by the array management module in dependence upon the location of the control information for the storage device, a request to store the control information for the storage device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DESCRIPTION OF EMBODIMENTS

Figure 1:
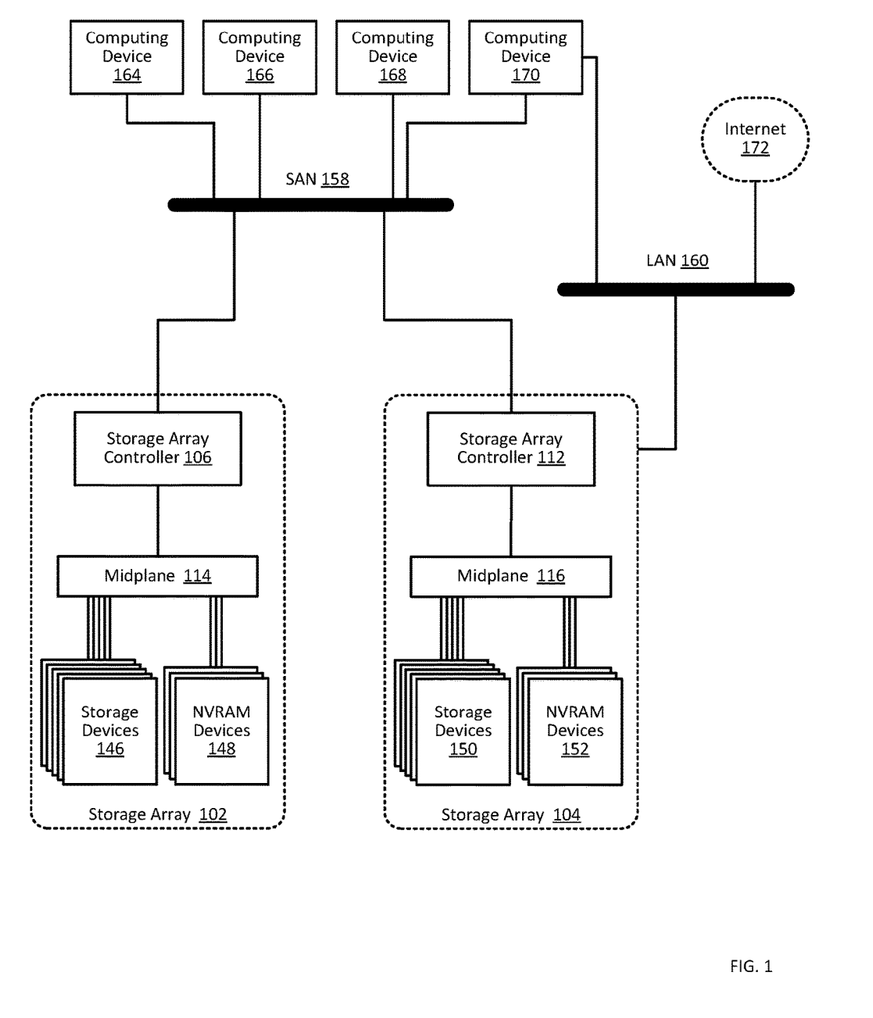
FIG. 1 sets forth a block diagram of a system configured for dynamically managing control information in a storage device according to embodiments of the present invention.

Example methods, apparatuses, and products for dynamically managing control information in a storage device in accordance with the present invention are described with reference to the accompanying drawings, beginning with FIG. 1. FIG. 1 sets forth a block diagram of a system configured for dynamically managing control information in a storage device according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to one or more storage arrays (102, 104) through a storage area network ('SAN') (158) as well as a local area network ('LAN') (160). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one of many possible data communications couplings which may be implemented between a computing device (164, 166, 168, 170) and a storage array (102, 104), and readers will further appreciate that any other data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), and others as will occur to those of skill in the art.

The example storage arrays (102, 104) of FIG. 1 provide persistent data storage for the computing devices (164, 166, 168, 170). Each storage array (102, 104) depicted in FIG. 1 includes a plurality of storage array controllers (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing Redundant Array of Independent Drives ('RAID') or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of non-volatile Random Access Memory ('NVRAM') devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device may be carried out more quickly than writing data to the storage device. The storage array controller (106, 112) may be configured to effectively utilize the NVRAM devices (148, 152) as a quickly accessible buffer for data destined to be written to the storage devices. In this way, the latency for write requests may be significantly improved relative to a system in which the storage array controller writes data directly to the storage devices (146, 150).

The NVRAM devices may be implemented with computer memory in the form of high bandwidth, low latency RAM. In such an embodiment, each NVRAM device is referred to as 'non-volatile' because each NVRAM device may receive or include a unique power source that maintains the state of the RAM after main power loss to the NVRAM device (148, 152). Such a power source may be a battery, one or more capacitors, or the like. During the power loss, the NVRAM device (148, 152) may be configured to write the contents of the RAM to a persistent storage, such as the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives ("Flash drives"), and the like.

The storage array controllers (106, 112) of FIG. 1 may be configured for dynamically managing control information in a storage device (146, 150) according to embodiments of the present invention. In the example depicted in FIG. 1, the control information can describe the state of one or more memory blocks in the storage device (146, 150). The control information may indicate, for example, that a particular memory block has failed and should no longer be written to, that a particular memory block contains boot code for a storage array controller (106, 112), the number of program-erase ('P/E') cycles that have been performed on a particular memory block, the age of data stored in a particular memory block, the type of data that is stored in a particular memory block, and so on.

In the example depicted in FIG. 1, the control information for the storage device (146, 150) may be stored in one or more particular memory blocks of the storage device (146, 150) that are selected by the storage array controller (106, 112). The selected memory blocks may be tagged with a special identifier indicating that the selected memory block contains control information. The special identifier may be utilized by the storage device (146, 150) to quickly identify those memory blocks that contain control information, for example, by the storage device (146, 150) issuing a special command to locate memory blocks that contain control information. Readers will further appreciate that the control information may be so large that segments of the control information may be stored in multiple locations, the control information may be stored in multiple locations for redundancy purposes, or the control information may otherwise be distributed across multiple memory blocks in the storage device (146, 150).

The storage array controllers (106, 112) may dynamically manage control information in a storage device (146, 150) by querying the storage device (146, 150) for a location of control information for the storage device (146, 150). Querying the storage device (146, 150) for the location of control information for the storage device (146, 150) may be carried out, for example, by the storage array controller (106, 112) causing a message of a predetermined format to be sent from the storage array controller (106, 112) to the storage device (146, 150). Such a message may include a request for the location of control information for the storage device (146, 150). In such an example, the storage device (146, 150) may be configured to respond to such messages by sending a response message that includes the location of control information for the storage device (146, 150).

The storage array controllers (106, 112) may further dynamically manage control information in a storage device (146, 150) by issuing, in dependence upon the location of the control information for the storage device (146, 150), a request to retrieve the control information for the storage device (146, 150). The request to retrieve the control information for the storage device (146, 150) may be embodied, for example, as one or more messages that are sent from the storage array controller to the storage device (146, 150). Issuing a request to retrieve the control information for the storage device (146, 150) may therefore be carried out, for example, by the storage array controller (106, 112) causing a message of a predetermined format to be sent from the storage array controller (106, 112) to the storage device (146, 150). Such a message may include the location of the control information for the storage device (146, 150) and any other useful information. In such an example, the storage device (146, 150) may be configured to respond to such messages by sending the control information to the storage array controller (106, 112).

The arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Dynamically managing control information in a storage device in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for dynamically managing control information in a storage device according to embodiments of the present invention.

Figure 2:
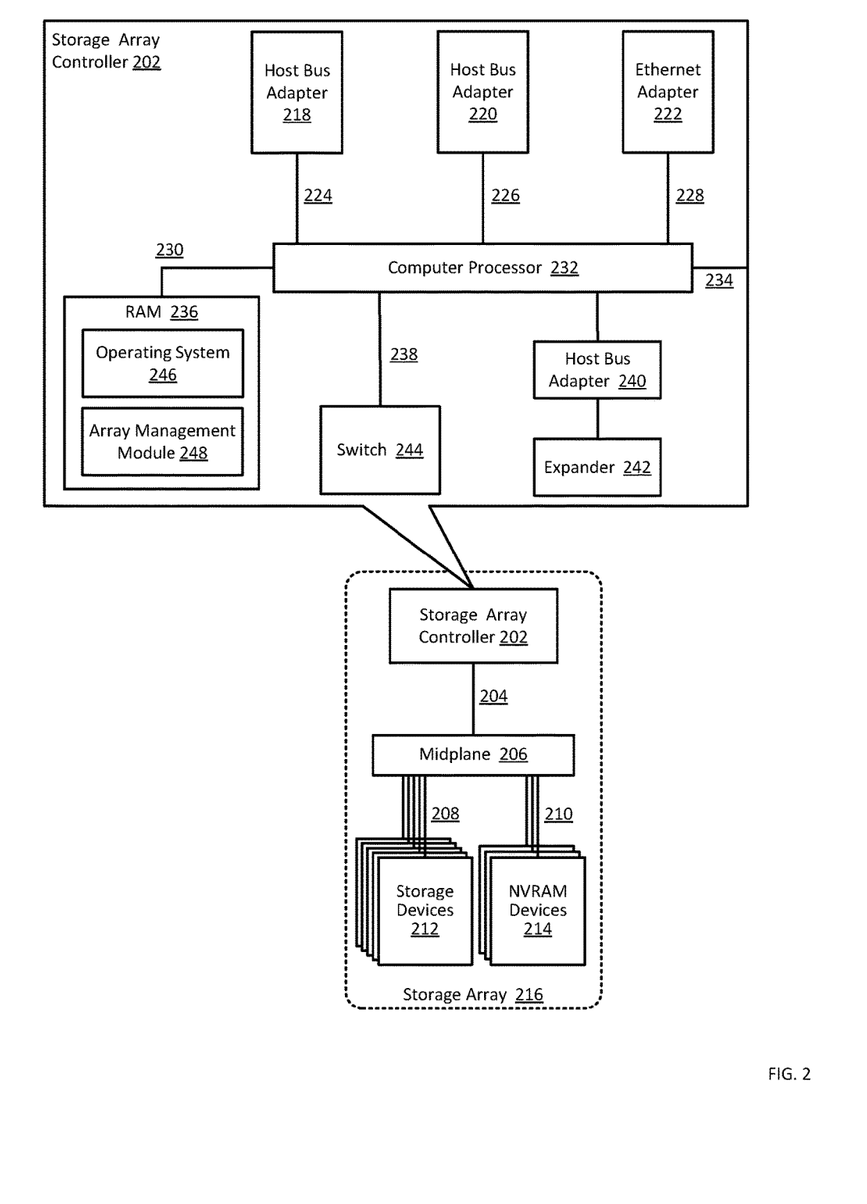
FIG. 2 sets forth a block diagram of an example storage array controller useful in dynamically managing control information in a storage device according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for dynamically managing control information in a storage device according to embodiments of the present invention include UNIX™, Linux™, Microsoft Windows™, and others as will occur to those of skill in the art. Also stored in RAM (236) is an array management module (248), a module of computer program instructions for dynamically managing control information in a storage device according to embodiments of the present invention. The functionality of the array management module (248) will be described in greater detail below, but readers will appreciate that while the array management module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of the present invention.

Figure 3:
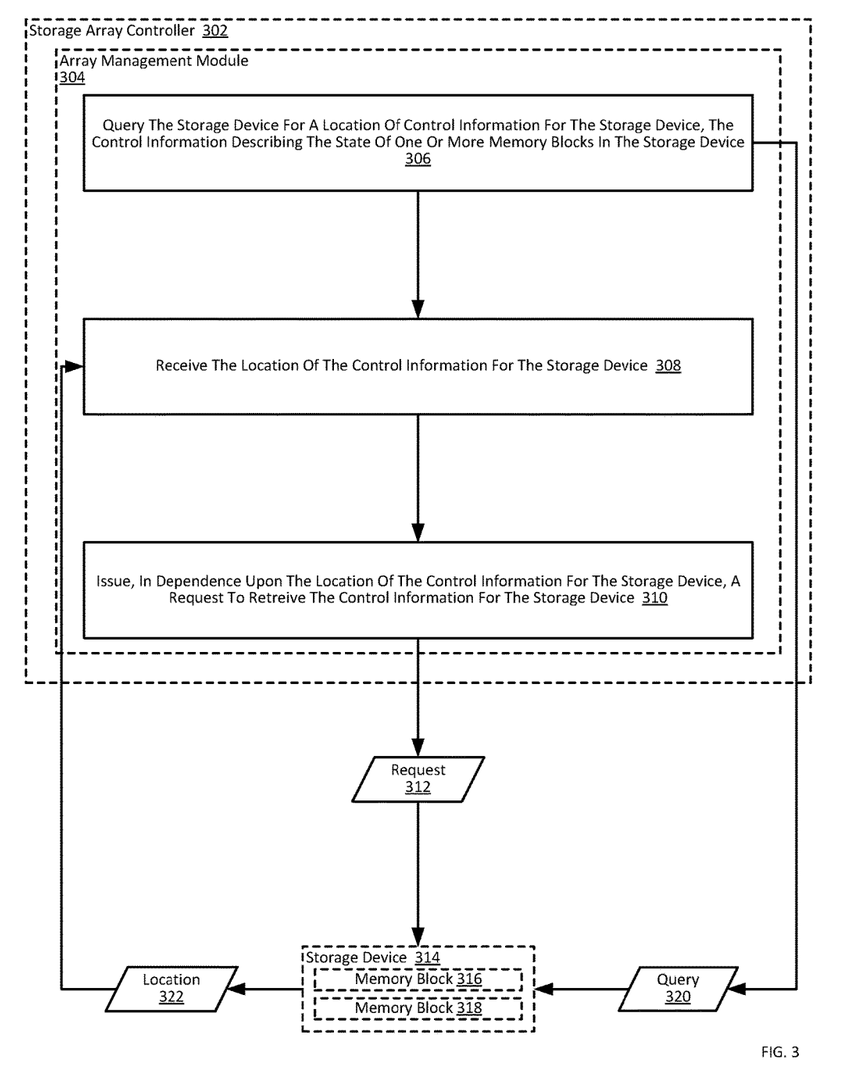
FIG. 3 sets forth a flow chart illustrating an example method for dynamically managing control information in a storage device according to embodiments of the present invention.

For further explanation, FIG. 3 sets forth a flow chart illustrating an example method for dynamically managing control information in a storage device (314) according to embodiments of the present invention. The control information for the storage device (314) describes the state of one or more memory blocks (316, 318) in the storage device (314). The control information may indicate, for example, that a particular memory block has failed and should no longer be written to, that a particular memory block contains boot code for the storage array controller (302), the number of P/E cycles that have been performed on a particular memory block, the age of data stored in a particular memory block, the type of data that is stored in a particular memory block, and so on.

In the example method depicted in FIG. 3, the control information for the storage device (314) may be stored in a particular memory block (316, 318) of the storage device (314) that is selected by the storage array controller (302). After the storage array controller (302) has selected a particular memory block (316, 318) to store control information, the selected memory block (316, 318) may be tagged with a special identifier indicating that the selected memory block (316, 318) contains control information. Tagging the selected memory block (316, 318) with a special identifier indicating that the selected memory block (316, 318) contains control information may be carried out, for example, by storing the special identifier in a header associated with the selected memory block (316, 318) that is reserved for storing metadata associated with the selected memory block (316, 318). Readers will appreciate that although control information may be so large that segments of the control information may be stored in multiple locations, the control information may be stored in multiple locations for redundancy purposes, or the control information may otherwise be distributed across multiple memory blocks (316, 318) in the storage device (314).

The example method depicted in FIG. 3 is carried out, at least in part, by an array management module (304) executing on a storage array controller (302). The storage array controller (302) of FIG. 3 may be similar to the storage array controllers described above with reference to FIG. 1 and FIG. 2, as the storage array controller (302) may include computer hardware such as a CPU for processing computer program instructions, as well as computer memory for storing computer program instructions, data, and the like. As such, the array management module (304) of FIG. 3 may be embodied, for example, as a module of computer program instructions stored in computer memory in the storage array controller (302) that are executed on computer hardware such as a CPU in the storage array controller (302).

The example method depicted in FIG. 3 includes querying (306), by the array management module (304) executing on the storage array controller (302), the storage device (314) for the location (322) of control information for the storage device (314). Querying (306) the storage device (314) for the location (322) of control information for the storage device (314) may be carried out, for example, by the array management module (304) causing a message of a predetermined format to be sent from the storage array controller (302) to the storage device (314). Such a message may include a request for the location (322) of control information for the storage device (314).

In such an example, the storage device (314) may be configured to execute special purpose instructions that enable the storage device (314) to identify the location (322) of control information for the storage device (314). Such special purpose instructions may be executed by a controller on the storage device (314) and may cause the storage device (314) to scan a portion of each memory block to identify those memory blocks that house control information for the storage device (314). The storage device (314) may subsequently send a response message to the storage array controller (302) that includes the location (322) of control information for the storage device (314). As such, the example method depicted in FIG. 3 includes the array management module (304) receiving (308) the location (322) of control information for the storage device (314). In the example method depicted in FIG. 3, querying (306) the storage device (314) for the location (322) of control information for the storage device (314) may occur during start-up of the storage array controller (302) or at any other time in accordance with embodiments of the present invention.

The example method depicted in FIG. 3 also includes issuing (310), by the array management module (304) in dependence upon the location (322) of the control information for the storage device (314), a request (312) to retrieve the control information for the storage device (314). The request (312) to retrieve the control information for the storage device (314) may be embodied, for example, as one or more messages that include the location (322) of the control information for the storage device (314), an identifier indicating that the request is a read request, and any other information needed to process the request. Issuing (310) a request (312) to retrieve the control information for the storage device (314) may therefore be carried out, for example, by the array management module (304) causing one or more messages of a predetermined format to be sent from the storage array controller (302) to the storage device (314).

Figure 4:
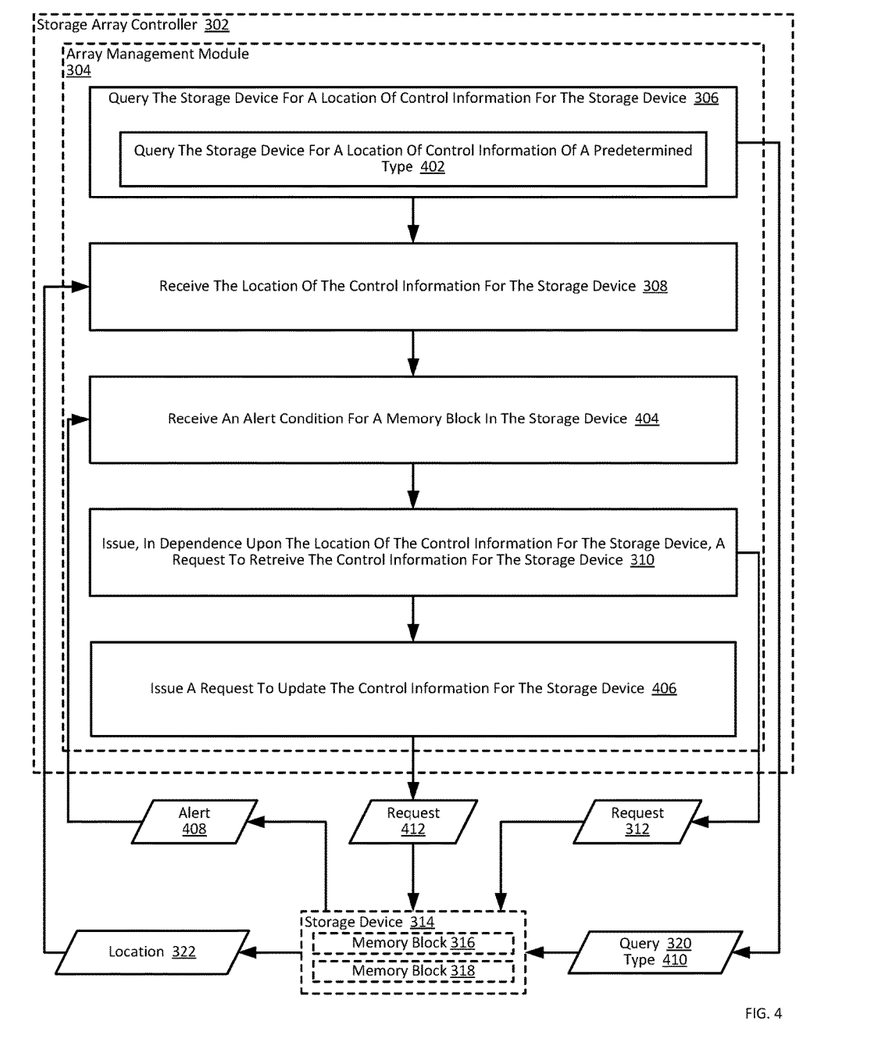
FIG. 4 sets forth a flow chart illustrating an additional example method for dynamically managing control information in a storage device according to embodiments of the present invention.

For further explanation, FIG. 4 sets forth a flow chart illustrating an additional example method for dynamically managing control information in a storage device (314) according to embodiments of the present invention. The example method depicted in FIG. 4 is similar to the example method depicted in FIG. 3, as the example method depicted in FIG. 4 also includes querying (306) the storage device (314) for a location (322) of control information for the storage device (314), receiving (308) the location (322) of the control information for the storage device (314), and issuing (310) a request to retrieve the control information for the storage device (314) in dependence upon the location (322) of the control information for the storage device (314).

In the example method depicted in FIG. 4, the storage device (314) can include control information of a plurality of types. Each type of control information represents different aspects of the state of one or more memory blocks (316, 318) in the storage device (314). For example, a first type of control information may include information describing the number of PIE cycles that have been performed on each memory block, a second type of control information may include information describing a bad block list that identifies all memory blocks in the storage device (314) that have failed, a third type of control information may include information describing the amount of time that the data currently residing in each memory block has been stored in stored in the memory block, and so on. In the example method depicted in FIG. 4, each type of control information may be associated with a unique identifier. For example, a first type of control information that describes the number of P/E cycles that have been performed on each memory block may be associated with an identifier of '1', a second type of control information that describes a bad block list may be associated with an identifier of '2', a third type of control information that describes the amount of time that the data currently residing in each memory block has been stored in stored in the memory block may be associated with an identifier of '3', and so on. Through the use of such unique identifiers, different types of control information can be distinguished from each other.

Readers will appreciate that, as described above, a particular memory block that is selected to store control information may be tagged with an identifier designating the memory block as a memory block that includes control information. Such a memory block may also be tagged with identifiers such as those described in the preceding paragraph. In such a way, a particular memory block may be tagged with information that not only indicates that control information is stored in the particular memory block, but the particular memory block may also be tagged with information that indicates the type of control information that is stored in the particular memory block.

In the example method depicted in FIG. 4, querying (306) the storage device (314) for the location (322) of control information for the storage device (314) can include querying (402) the storage device (314) for a location of control information of a predetermined type (410). Querying (402) the storage device (314) for the location of control information of the predetermined type (410) may be carried out, for example, by the array management module (304) causing a message of a predetermined format to be sent from the storage array controller (302) to the storage device (314). Such a message may include a request for the location (322) of control information for the storage device (314) as well as an identifier of the type of control information whose location is requested. In such an example, the storage device (314) may be configured to respond to such messages by sending a response message that includes the location (322) of control information of the predetermined type (410). As such, the example method depicted in FIG. 3 includes the array management module (304) receiving (308) the location (322) of control information of the predetermined type (410).

The example method depicted in FIG. 4 can include receiving (404), by the array management module (304), an alert (408) condition for a memory block (316, 318) in the storage device (314). An alert (408) condition for a memory block (316, 318) in the storage device (314) may be issued when the storage device (314) detects that a particular memory block has failed, when the storage device (314) detects that a particular memory block is failing, when the storage device (314) detects that data stored in a particular memory block has been corrupted, and so on. As such, the alert (408) condition for a memory block (316, 318) in the storage device (314) may include information such as the location of the memory block that is the subject of the alert, the type of alert condition that has been observed, and so on. The alert (408) condition for the memory block (316, 318) may be detected as part of a scheduled scan performed by the storage device (314), as part of servicing a memory access request by the storage device (314), as part of a scan performed by the storage device (314) at the behest of the storage array controller (302), or in other ways.

In the example method of FIG. 4, the array management module (304) may receive (404) the alert (408) condition for the memory block (316, 318) in the storage device (314) by receiving a message from the storage device (314). Such a message may include metadata identifying the message as an alert (408), as well as information describing the location of the memory block that is the subject of the alert, the type of alert condition that has been observed, and so on.

The example method depicted in FIG. 4 also includes issuing (406) a request (312) to update the control information for the storage device (314). Issuing (406) a request (412) to update the control information for the storage device (314) may be carried out in response to receiving (404) an alert (408) condition for a memory block (316, 318) in the storage device (314), as the control information may need to be updated to include information reflected in the alert (408). The request (412) to update the control information for the storage device (314) may be embodied, for example, as one or more messages exchanged between the storage array controller (302) and the storage device (314).

Consider an example in which the storage device (314) is embodied as an SSD, the alert (408) condition for a particular memory block (316) in the storage device (314) indicated that the particular memory block (316) has failed, and the control information includes a bad block list that is stored in a first memory block of the SSD. In such an example, the bad block list would need to be updated to add the particular memory block (316) that has failed to the bad block list. Updating the control information for the storage device (314) may therefore be carried out by the storage array controller (302) issuing a first message instructing the storage device (314) to write the updated bad block list to a second memory block in the SSD. In such an example, the second memory block may be tagged as a memory block that includes control information. The storage array controller (302) may subsequently issue a second message instructing the storage device (314) to erase the previous version of the bad block list that is stored in the first memory block of the SSD. In such an example, all information stored in the first memory block, as well as information identifying the first memory block as a memory block that stores control information, may be erased.

Readers will appreciate that 'updating' the control information for the storage device (314) can involve storing a new type of control information in the storage device (314). In such an example, the storage array controller (302) may select one or more memory blocks in the storage device (314) where the new type of control information is to be stored and the storage array controller (302) may also select an identifier to be used for the new type of control information. Through one or more messages sent from the storage array controller (302) to the storage device (314), the storage array controller (302) may cause the new type of control information to be stored in the selected memory block and may further cause the selected memory block to be tagged with the selected identifier.

Figure 5:
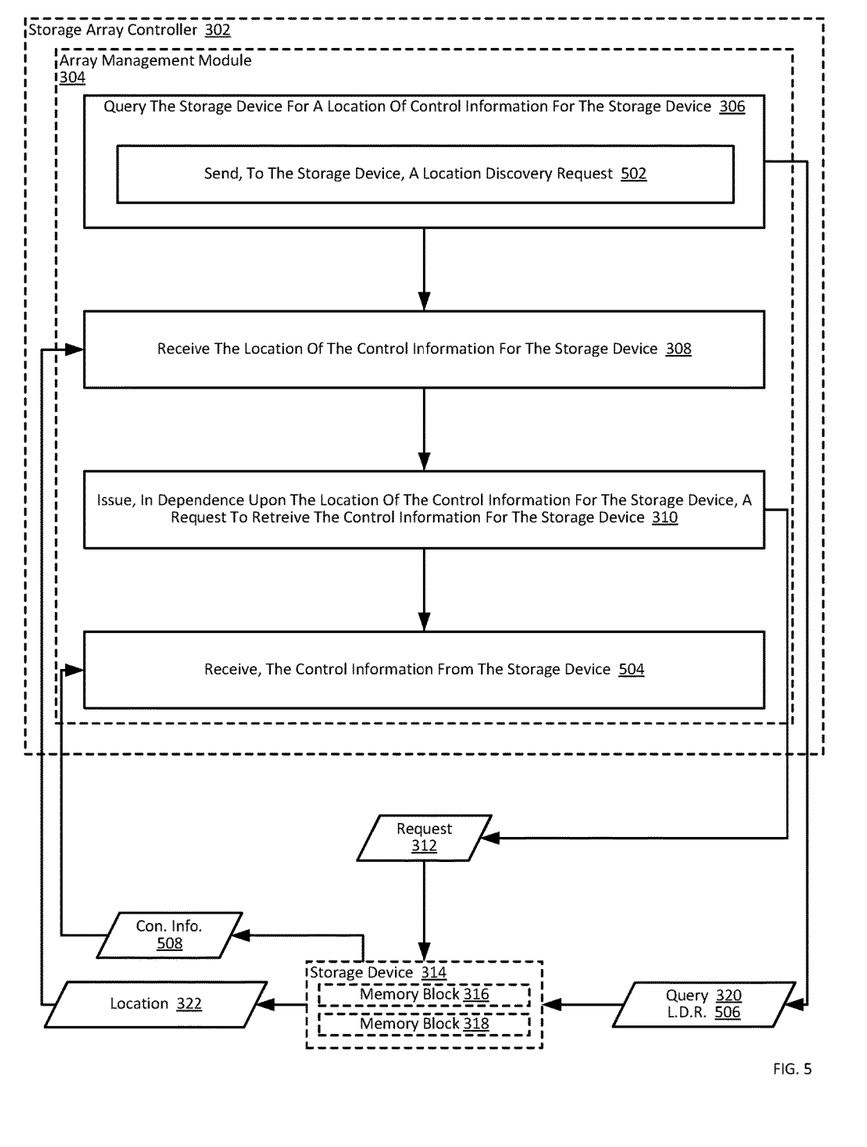
FIG. 5 sets forth a flow chart illustrating an additional example method for dynamically managing control information in a storage device according to embodiments of the present invention.

For further explanation, FIG. 5 sets forth a flow chart illustrating an additional example method for dynamically managing control information in a storage device (314) according to embodiments of the present invention. The example method depicted in FIG. 5 is similar to the example method depicted in FIG. 3, as the example method depicted in FIG. 5 also includes querying (306) the storage device (314) for a location (322) of control information for the storage device (314), receiving (308) the location (322) of the control information for the storage device (314), and issuing (310) a request to retrieve the control information for the storage device (314) in dependence upon the location (322) of the control information for the storage device (314).

In the example method depicted in FIG. 5, querying (306) the storage device (314) for a location (322) of control information for the storage device (314) can include sending (502), from the array management module (304) to the storage device (314), a location discovery request (506). The location discovery request (506) of FIG. 5 represents a special purpose instruction sent (502) from the array management module (304) to the storage device (314) instructing the storage device (314) to determine the location of control information that is stored on the storage device (314). The location discovery request (506) can be sent (502) from the array management module (304) to the storage device (314), for example, when the storage array controller (302) is powered on. In such an example, the location discovery request (506) may represent a single request to identify the location of each type of control information that is stored in the storage device (314).

Consider an example in which a primary storage controller fails, thereby causing a backup storage controller to be powered on or otherwise transitioned from an inactive state to an active state as part of a failover process. In such an example, the backup storage controller may not know the location of any control information on the storage device (314). By issuing a location discovery request (506), the backup storage controller may determine the location of all control information stored on the storage device (314).

Readers will appreciate that an array management module (304) may also send (502) a location discovery request (506) to the storage device (314) at times other than during when the storage array controller (302) is booting. For example, control information may be periodically moved, control information may grow over time to expand into additional memory blocks (316), or other actions may occur that cause the array management module (304) to send (502) a location discovery request (506) to the storage device (314). In addition, the array management module (304) may periodically send (502) a location discovery request (506) to the storage device (314) to verify the correctness of location information maintained by the array management module (304).

The example method depicted in FIG. 5 also includes receiving (504), by the array management module (304), the control information (508) from the storage device (314). Receiving (504) the control information (508) from the storage device (314) may be carried out, for example, by the array management module (304) receiving the control information (508) via one or more messages. In such an example, the storage array controller (302) may store the control information (508) in local memory of the storage array controller (302) for use by the storage array controller (302).

Consider an example in which the control information (508) is embodied as boot code used to boot the storage array controller (302) and querying (306) the storage device (314) for a location (322) of control information for the storage device (314) occurs during start-up of the storage array controller (302). In such an example, receiving (504) the control information (508) from the storage device (314) can result in the storage array controller (302) receiving boot code used to boot the storage array controller (302), which may be subsequently stored in local memory on the storage array controller (302) and executed to boot the storage array controller (302).

In an alternative example where the control information (508) includes a bad block list, receiving (504) the control information (508) from the storage device (314) can result in the storage array controller (302) receiving a bad block list which may be subsequently stored in local memory on the storage array controller (302). In such an example, as requests to write data to the storage device (314) are received by the storage array controller (302), the storage array controller (302) may utilize the bad block list to direct write accesses to memory blocks that are not on the bad block list.

Readers will appreciate that although the examples depicted in FIGS. 3-5 illustrate example methods for dynamically managing control information in a storage device where various steps are depicted as occurring in a certain order, such an ordering is not necessarily required in order to dynamically manage control information in a storage device according to embodiments of the present invention. In fact, a requirement that steps be performed in a certain order only exists where the performance of a particular step is described as occurring 'responsive to' the performance of another step. As such, the examples depicted in FIGS. 3-5 only illustrate specific embodiments for dynamically managing control information in a storage device.

Example embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   receiving, at a storage array controller, a write request directed to a storage system comprising a plurality of storage devices, wherein each of the plurality of storage devices stores respective control information describing a state of one or more memory blocks;
   querying, by the storage array controller, a particular storage device for a location storing control information for the particular storage device subsequent to receiving the write request;
   retrieving, by the storage array controller from the location received in response to querying the particular storage device, the control information for the particular storage device;
   selecting, for the write request and in dependence upon the control information previously received from the storage device, a write location within the particular storage device;
   issuing, to the particular storage device by the storage array controller, the write request to the write location;
   receiving, by the storage array controller, an alert condition for a memory block in the particular storage device, wherein the alert condition indicates when a memory block has failed or has been corrupted; and
   issuing a request to update the control information stored within the particular storage device, responsive to receiving the alert condition.

2. The method of claim 1 wherein:
   the control information is one type from among a plurality of types of control information; and
   querying the particular storage device further comprises querying the particular storage device for an identification of a plurality of memory blocks that contain control information of a predetermined type.

3. The method of claim 1 wherein querying the particular storage device occurs during start-up of the storage array controller and wherein the control information includes boot code for the storage array controller, the method further comprising:
   booting the storage array controller utilizing boot code retrieved from the particular storage device.

4. The method of claim 1 wherein querying the particular storage device further comprises sending, from the storage array controller to the particular storage device, a location discovery request.

5. The method of claim 1 wherein:
   the control information includes a bad block list; and
   issuing, by the storage array controller, the write request to the location within the particular storage device selected in dependence upon the control information retrieved from the particular storage device further comprises issuing the write request to a memory block that is not on the bad block list.

6. An apparatus comprising a computer processor, a computer memory operatively coupled to the computer processor, the computer memory having disposed within it computer program instructions that, when executed by the computer processor, cause the apparatus to carry out the steps of:

receiving, at a storage array controller, a write request directed to a storage system comprising a plurality of storage devices, wherein each of the plurality of storage devices stores respective control information describing a state of one or more memory blocks;

querying, by the storage array controller, a particular storage device for a location storing control information for the particular storage device subsequent to receiving the write request;

retrieving, by the storage array controller from the location received in response to querying the particular storage device, the control information for the particular storage device;

selecting, for a write request and in dependence upon the control information previously received from the particular storage device, a write location within the particular storage device;

issuing, to the particular storage device by the storage array controller, the write request to the write location;

receiving, by the storage array controller, an alert condition for a memory block in the particular storage device, wherein the alert condition indicates when a memory block has failed or has been corrupted; and issuing a request to update the control information stored within the particular storage device, responsive to receiving the alert condition.

7. The apparatus of claim 6 wherein:

the control information is one type from among a plurality of types of control information; and querying the particular storage device further comprises querying the particular storage device for an identification of a plurality of memory blocks that contain control information of a predetermined type.

8. The apparatus of claim 6 wherein querying the particular storage device occurs during start-up of the storage array controller and wherein the control information includes boot code for the storage array controller, the apparatus further comprising computer program instructions that, when executed by the computer processor, cause the apparatus to carry out the step of:

booting the storage array controller utilizing boot code retrieved from the particular storage device.

9. The apparatus of claim 6 wherein querying the particular storage device further comprises sending, from the storage array controller to the particular storage device, a location discovery request.

10. The apparatus of claim 6 wherein:

the control information includes a bad block list; and issuing, by the storage array controller, the write request to the location within the particular storage device selected in dependence upon the control information retrieved from the particular storage device further comprises issuing the write request to a memory block that is not on the bad block list.

11. A storage system comprising a computer memory and a computer processor, the computer memory including computer program instructions that, when executed by the computer processor, cause the storage system to carry out the steps of:

receiving, at a storage array controller, a write request directed to a storage system comprising a plurality of storage devices, wherein each of the plurality of storage devices stores respective control information describing a state of one or more memory blocks;

querying, by storage array controller, a particular storage device for a location storing control information for the particular storage device subsequent to receiving the write request;

retrieving, by the storage array controller from the location received in response to querying the particular storage device, the control information for the particular storage device;

selecting, for a write request and in dependence upon the control information previously received from the particular storage device, a write location within the particular storage device;

issuing, to the particular storage device by the storage array controller, the write request to the write location;

receiving, by the storage array controller, an alert condition for a memory block in the particular storage device, wherein the alert condition indicates when a memory block has failed or has been corrupted; and issuing a request to update the control information stored within the particular storage device, responsive to receiving the alert condition.

12. The storage system of claim 11 wherein:

the control information is one type from among a plurality of types of control information; and wherein the computer program instructions further, when executed by the computer processor, cause the storage system to carry out the step of:

querying the particular storage device further comprises querying the particular storage device for an identification of a plurality of memory blocks that contain control information of a predetermined type.

13. The storage system of claim 11 wherein querying the particular storage device occurs during start-up of the storage array controller and wherein the control information includes boot code for the storage array controller, the method further comprising:

booting the storage array controller utilizing boot code retrieved from the particular storage device.

14. The storage system of claim 11 wherein querying the particular storage device further comprises sending, from the storage array controller to the particular storage device, a location discovery request.

15. The storage system of claim 11 wherein:

the control information includes a bad block list; and issuing, by the storage array controller, the write request to the location within the particular storage device selected in dependence upon the control information retrieved from the particular storage device further comprises issuing the write request to a memory block that is not on the bad block list.

* * * * *